United States Patent [19]
Hornick

[11] Patent Number: 5,929,386
[45] Date of Patent: Jul. 27, 1999

[54] POWER CORD SET FOR AN ELECTRIC TOOL

[75] Inventor: George Michael Hornick, Anderson, S.C.

[73] Assignee: Ryobi North America, Inc., Anderson, S.C.

[21] Appl. No.: 08/927,309

[22] Filed: Sep. 11, 1997

[51] Int. Cl.$^6$ ............................................. H01B 7/02
[52] U.S. Cl. ................................. 174/135; 439/455
[58] Field of Search ................ 174/135; 439/568, 439/284, 455, 453, 454

[56] References Cited

U.S. PATENT DOCUMENTS 3,858,160  12/1974  Denton .
4,632,488  12/1986  Long et al. .
4,869,686   9/1989  Michaels et al. .
5,320,557   6/1994  Gizienski .
5,571,145  11/1996  Drebin .

*Primary Examiner*—Dean A. Reichard
*Attorney, Agent, or Firm*—Brooks & Kushman P.C.

[57] ABSTRACT

A power cord set for use in any one of a number of a plurality of different electric tools is provided in order to minimize inventory costs. A power cords set is made up of an electric cord, an electric plug and a strain relief connector assembly having a flexible body with a non-cylindrical section for attachment to a tool housing and at least two electrical connectors which in turn are electrically connected to the tool's electric powered implement.

4 Claims, 1 Drawing Sheet

U.S. Patent Jul. 27, 1999 5,929,386
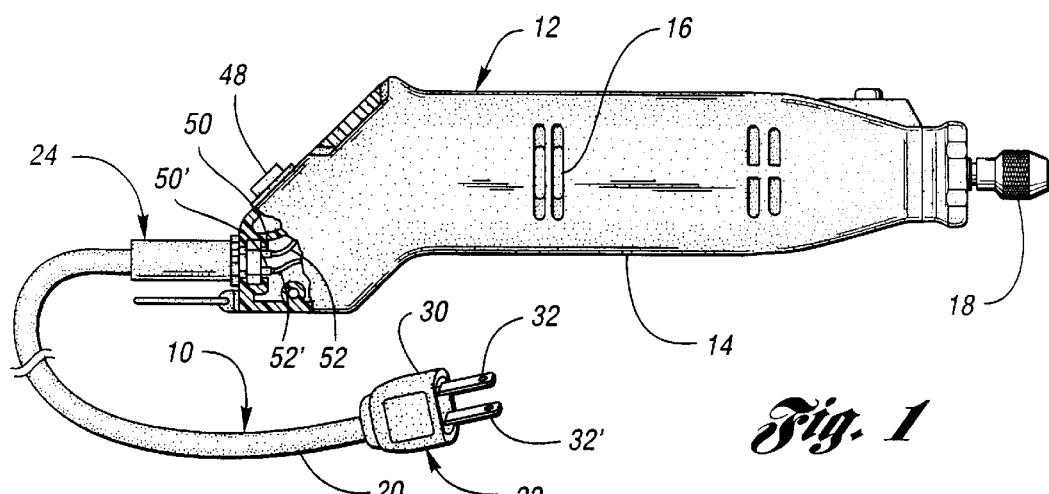
*Fig. 1*
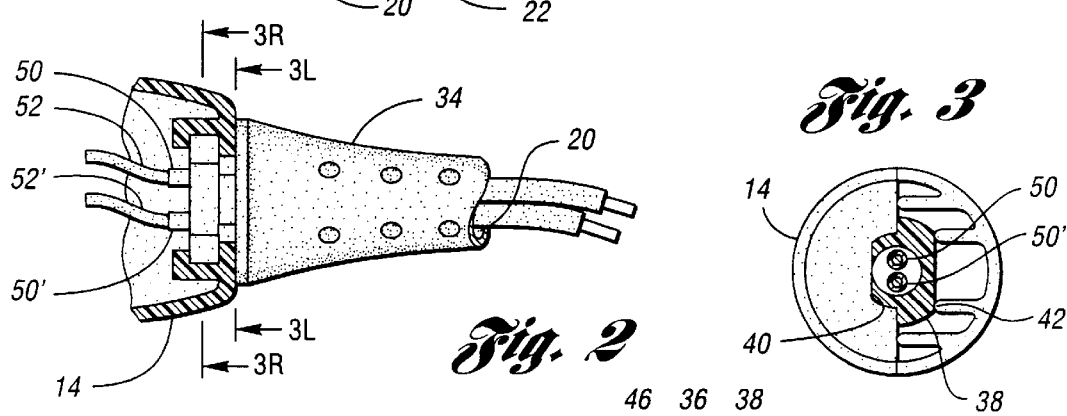
*Fig. 2*
*Fig. 3*
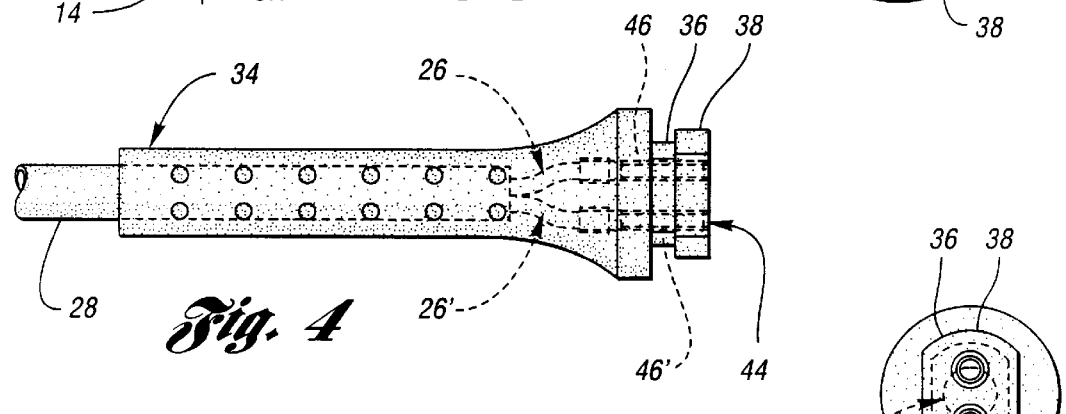
*Fig. 4*
*Fig. 5*
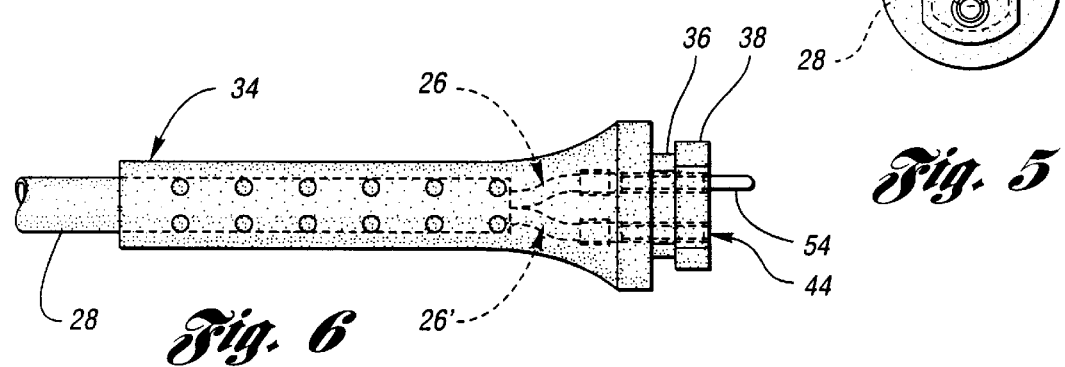
*Fig. 6*

POWER CORD SET FOR AN ELECTRIC TOOL

TECHNICAL FIELD

The present invention relates to power cord sets used in electrical tools.

BACKGROUND OF THE INVENTION

Electrical tools are conventionally provided with a power cord set made up of an elongated electric cord having an electric plug at one end and the opposite end mechanically and electrically connected to the electric tool. The end of the electric cord connected to the electric tool is typically provided with a molded strain relief flexible body attached to the outer insulator of the electric cord and mechanically connected to the electric tool housing. The flexible body of the strain relief prevents the wires within the electrical cord from being broken as a result of being repeatedly bent in a small radius.

Typically, individual wires which makes up the flexible cord, extend through the strain relief element and electrically connect to the internal electric power driven portion of the power tool i.e. an electric motor or the like. The line lead wire is typically electrically connected to a power switch in order to regulate operation of the tool. The length and the end treatment of the wire leads of the power cord set varies depending upon the application, therefore, it is quite common for a power tool manufacturer to inventory dozens of different power cord sets. While power cord sets may vary somewhat due to the desired cord length, the primary distinction between varying stock keeping units (SKU's) is the length of the wire leads extending and the type of electrical connector formed on the wire end. The number of SKU's for cord sets is not only a problem at the time of manufacturing due to the inventory requirements for each of the cord sets, but it remains a problem throughout the product's life since replacement cord sets have to be maintained in product service centers because cord sets are a rather frequent replacement item.

SUMMARY OF THE INVENTION

The object of the present invention is to provide a universal power cord set capable of being used with a plurality of different power tools in order to minimize the number of cord sets used via a power tool manufacturer.

It is a further objection of the present invention to provide a power cord set which is low cost and simple to manufacture.

Accordingly, the power cord set of the present invention is provided for use with any one of a plurality of electric tools that have a housing, an electric powered implement oriented within the housing. The cord set is made up of an elongated electric cord containing at least two flexible wires, an electric plug affixed to one end of the electric cord and a strain relief connector assembly affixed to the other end of the electric cord. The strain relief connector assembly is provided with an elongated flexible body extending about a length of the electric cord adjacent the end for mechanically attaching to and projecting into the electric tool housing. The strain relief-connector assembly is further provided with an electrical connector electrically connected to the at least two wires in the electric cord with the electrical connector projecting into the tool housing. The electric powered implement is provided with an internal pair of wires having a pair of connectors for cooperation with the strain relief connector assembly.

DESCRIPTION OF THE DRAWINGS

FIG. 1 is a partially cut-away view of an electric rotary tool embodying the present invention;

FIG. 2 is a cross-section side elevation of an alternative strain relief connector assembly and an associated portion of a tool housing;

FIG. 3 is a composite cross-section view, the right side is taken along line 3R—3R of FIG. 2 and the left side is taken along line 3L—3L of FIG. 2;

FIG. 4 is an enlarged side elevational view of the strain relief connector assembly;

FIG. 5 is a partially cut-away axial end view of the strain relief connector assembly; and FIG. 6 is a different embodiment of the strain relief connector assembly shown in FIG. 4.

DETAILED DESCRIPTION OF THE INVENTION

A power cord set 10 is shown in FIG. 1 and attached to electric tool 12, a hand held rotary grinder. Electric tool 12 is provided with a housing 14 which encloses an electric powered implement, motor 16, which drives rotary collet 18. It should be appreciated that the invention is intended to be used with a plurality of different electric tools and the rotary grinder depicted is simply for illustration purposes. Similarly, an electric powered implement need not be an electric motor, but rather could be a transformer as in the case of a hand held soldering gun.

Power cord set 10 is made up of an elongated length of electric cord 20 having two ends. One end is provided with an electrical plug 22 and the other end is provided with a strain relief connector assembly 24. Electric cord 20 has at least two flexible wires located therein extending the length of the cord. In the embodiment illustrated, electric cord 20 is provided with two conductors as shown in the FIG. 4, however, if a three-prong electric plug is utilized having a separate ground, a three conduct electric cord would be utilized with the power tool. The side view of the power cord 20 shown in FIG. 4 illustrates two flexible wires, 26 and 26', which are surrounded by an insulated coating 28.

Electric plug 22 is of a conventional design and is provided with a plug body 30 which is mechanically affixed to one end of the electric cord 20 and has at least two conductive prongs, 32 and 32', which are electrically connected respectively to the at least two flexible wires 26 and 26'. Strain relief connector assembly 24 is affixed to the other end of the cord as illustrated in FIG. 1. The strain relief connector assembly 24 has a flexible body 34 (FIG. 2) which extends about a length of electric cord 20 adjacent the cord end opposite plug 22. Flexible body 34 surrounds and reinforces the cord 20 preventing the cord from being bent too sharply and to protect the cord from mechanical damage due to abrasion or the like. The strain relief connector assembly 34 is provided with a recessed portion formed by groove 36 (FIG. 4) to facilitate mechanically attaching the strain relief connector assembly to the housing 14. Groove 36 is preferably annular extending about the end strain relief connector assembly 24 immediately adjacent its free end which is defined by an enlarged head 38. As illustrated in FIGS. 3 and 5, flexible body 34 is noncircular in cross-section through groove 36 and through head 38. In the embodiment illustrated, the noncircular shape is referred to as a "double-D" design, namely a circle with two opposed flat sides. Groove 36 cooperates with a corresponding "double-D" shaped aperture 40 in tool housing 14 shown in FIG. 3. Enlarged head 38 which is located in a cavity inside of tool housing 14 cooperates with a series of ribs 42 which serve to prevent the enlarged head 38 from rotating relative to housing 14.

Strain relief electrical assembly 24 is further provided with electrical connector portion 44 best seen in FIGS. 4–5. Electrical connector portion 44 is made up of at least two discrete electrical connectors 46 and 46' which are respectively electrically connected to the at least two flexible wires 26 and 26'. In the preferred embodiment, the two electrical connectors are of a different configuration so as to insure the line lead wire is appropriately routed to the line lead connector prong 32 on the electrical plug 22 and likewise connected to a power switch 48 on electric tool 12. In the embodiment illustrated in FIG. 6, one of the electrical connectors is formed by a female Heyco terminal, (model number 7304-001) while the other electric connector 54 is formed by a male Heyco terminal, (model number 7030-801). Of course, other style connectors could be used. An electric powered implement of a power tool is provided with power input connectors 50 and 50' and associated conductors 52 and 52' which electrically cooperate with the electrical connector portion 44 which is securely removably joined thereto.

Ideally, the electrical connectors of 44 and 46' will be attached to the ends of conductive wires 26 and 26' and the flexible body 34 will be insert molded thereabout to securely mechanically bond the flexible body to the electric cord 20 and electrical connectors 46 and 46'.

The power cord set 10 of the present invention can be utilized with a plurality of different electric tools by electrically connecting the tool's electric powered implement to the electric connector and mechanically connecting the tool housing to the flexible body of the strain relief connector assembly. The universal power cord set of the present design therefore can alleviate the need for stocking a number of different power cord sets at a power tool manufacturing site and power tool service centers. The present power tool set can be manufactured in a limited number of cord lengths. In order to utilize the present power cord set and to repair a pre-existing power tool having a power cord set with a pair of electric wires extending from the strain relief with unique connectors, a simple set of jumpers may be provided with the unique connectors at one end and electrical connectors intended to cooperate with the electrical connectors 46 and 46' at the other end so that inventory costs and required storage volume can be dramatically minimized.

It is also understood, of course, that while the form of the invention herein shown and described constitutes a preferred embodiment of the invention, it is not intended to illustrate all possible forms thereof. It should also be understood that the words used in the specification are words of description rather than limitation and various changes may be made without departing from the spirit and scope of the invention.

What is claimed is:

1. A power cord set for use in any one of a plurality of electric tools having a housing, an electric powered implement oriented within the housing, and power input connectors connected through conductors to the electric powered implement, the power cord set comprising:

an elongated length of electric cord having at least two flexible wires surrounded by an insulator coating;

an electrical plug for cooperation with an electrical outlet, the electrical plug affixed to one end of the electric cord and provided with a plug body and at least two conductive prongs electrically connected respectively to the at least two flexible wires; and a strain relief connector assembly affixed to the other end of the electrical cord and having a flexible body, the strain relief connector assembly further including an electrical connector portion having at least two electrical connectors respectively connected to the at least two flexible wires of the electric cord, the at least two electrical connectors being connectable to the power input connectors, the strain relief connector assembly having a flexible body extending about a length of the electric cord, the strain relief connector assembly having, at a free end thereof, an enlarged head spaced from the remainder of the strain relief connector assembly by a generally annular recess, the diameter of the recess being smaller than the diameter of the strain relief connector assembly proximate the recess and also smaller than the diameter of the enlarged head, the circumferential configurations of both the recess and the enlarged head having diametrically opposed flat portions, and the enlarged head being positionable within the housing and behind a housing aperture having a configuration and dimensions matching those of the recess, wherein the power cord set can be installed in any one of a plurality of electric tools so that the electric connectors provide electric power to the electric powered implement, so that the enlarged head prevents the strain relief connector assembly from being inadvertently withdrawn from the housing, and so that the flat portions of the recess cooperate with those of the housing aperture to prevent rotation of the strain relief connector assembly.

2. The power cord set of claim 1 wherein the at least two electrical connectors are mechanically connected to the at least two flexible wires of the electric cord and the flexible body is molded about the insulator coating of the flexible wires, securely bonding the flexible body to the electric cord and the at least two electrical connectors.

3. The power cord set of claim 2 wherein the at least two electrical connectors have different configurations.

4. The power cord set of claim 3 wherein one of the at least two electrical connectors is a male connector and one of the at least two electrical connectors is a female connector.

* * * * *